United States Patent [19]

Janson

[11] Patent Number: 4,893,825
[45] Date of Patent: Jan. 16, 1990

[54] CONTROLLED COMPLIANCE FOR REAR WHEEL STEERING

[75] Inventor: David A. Janson, Plymouth, Mich.

[73] Assignee: Eaton Corporation, Cleveland, Ohio

[21] Appl. No.: 240,881

[22] Filed: Sep. 2, 1988

[51] Int. Cl.$^4$ ............................................. B62D 6/04
[52] U.S. Cl. ....................................... 280/81.6; 280/91
[58] Field of Search ................. 280/81.6, 91, 94, 673; 180/140

[56] References Cited

U.S. PATENT DOCUMENTS

| | | | |
|---|---|---|---|
| 3,291,503 | 12/1966 | Delay | 280/426 X |
| 4,449,726 | 5/1984 | Strifler et al. | 280/94 |
| 4,740,012 | 4/1988 | Kondo et al. | 280/690 |
| 4,770,264 | 9/1988 | Wright et al. | 180/140 |

FOREIGN PATENT DOCUMENTS 60-166563  8/1985  Japan ........................... 280/91

Primary Examiner—John A. Pekar
Attorney, Agent, or Firm—P. S. Rulon

[57] ABSTRACT

An apparatus (22) selectively provides passive rear wheel steering in response to lateral forces acting on the rear wheels during turning maneuvers initiated by a front wheel steering assembly (14). A control assembly (24) includes a logic (104) responsive to signals from a front wheel steer angle sensor (102) and a vehicle speed sensor (100), and provides signals to latches (70,72) of apparatus (22) for effecting same and opposite direction rear wheel steering angles relative to the front wheels. The logic prevents opposite direction steering in response to vehicle speeds above predetermined amount.

7 Claims, 3 Drawing Sheets

CONTROLLED COMPLIANCE FOR REAR WHEEL STEERING

FIELD OF THE INVENTION

The present invention relates to passive steering of the rear wheels of a vehicle. More specifically, the invention relates apparatus selectively operative to effect same and opposite direction steering of the rear wheels relative to the front wheels.

DESCRIPTION OF THE PRIOR ART

Lateral forces acting on the rear wheels of a vehicle during turning maneuvers initiated by front wheel steering are known to cause flexing of rubber bushings in the joints of rear wheel suspension links and that the flexing effects minor steer angle changes of the rear wheels. It is also known that the compression rates of certain of these bushings can be tailored to provide so-called passive rear wheel steering for effecting predetermined and desired steer angle changes.

SUMMARY OF THE INVENTION

An object of the present invention is to provide a selectively controllable apparatus for passive rear wheel steering.

According to a feature of the invention, an apparatus is provided for varying the steer angles of rear wheel assemblies of a vehicle having longitudinal and transverse axes and steerable front wheels. Each wheel assembly includes a wheel mounted for rotation and track parallel to the longitudinal axis on a stub axle supported from the vehicle chassis by at least pairs of transverse and substantially parallel swing links pivotally attached at one end to the wheel assembly ahead of and to the rear of the axle center line. The apparatus comprises one or more rear steer assemblies mounting the other end of at least one of each pair of links for movement transverse to the vehicle and biasing the transversely movable ends in opposite direction transverse to the vehicle, and including a latch having a first position locking the movable ends in a position wherein the rear wheels track parallel to the longitudinal axis and a second position allowing the movable ends to move in the same direction in response to transverse forces acting on the rear wheels.

BRIEF DESCRIPTION OF THE DRAWINGS

A passive rear wheel steering apparatus according to the present invention is shown in the accompanying drawings in which.

DETAILED DESCRIPTION OF THE DRAWINGS

Figure 1:
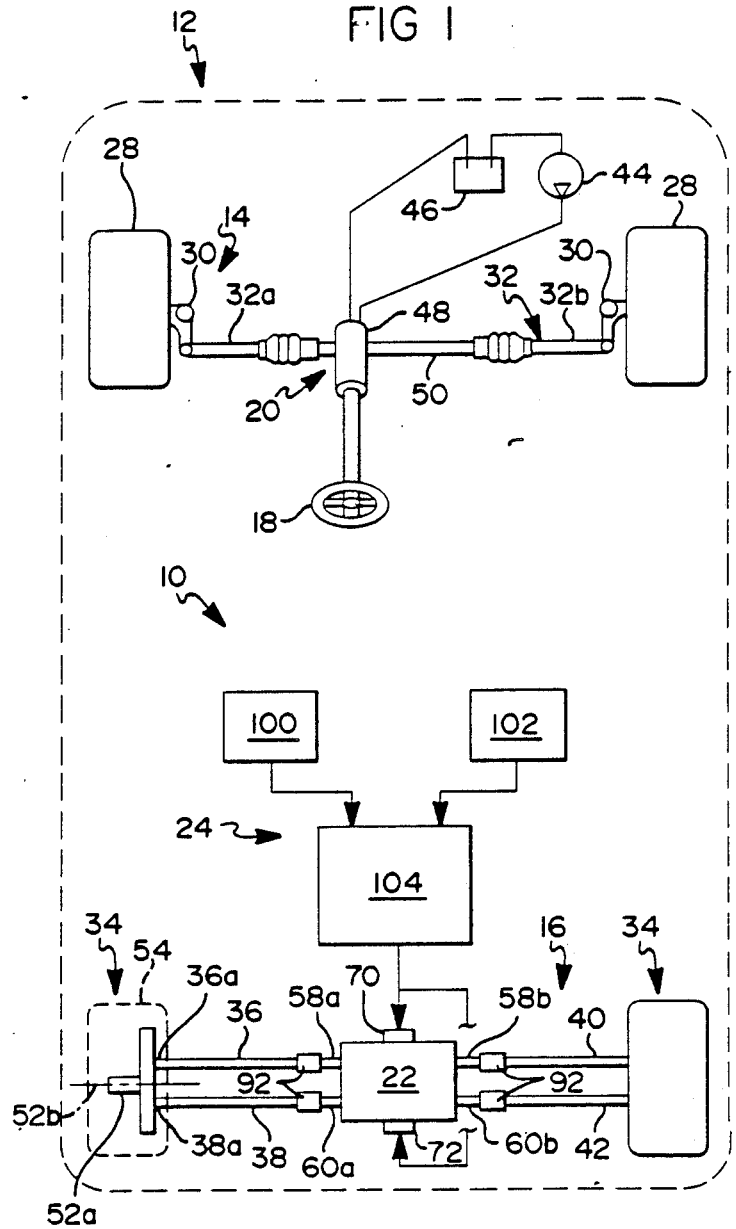
FIG. 1 is a schematic plan view of a vehicle steering system having a passive steer apparatus of the invention disposed between the rear wheels and with a control assembly therefore.
Figure 2:
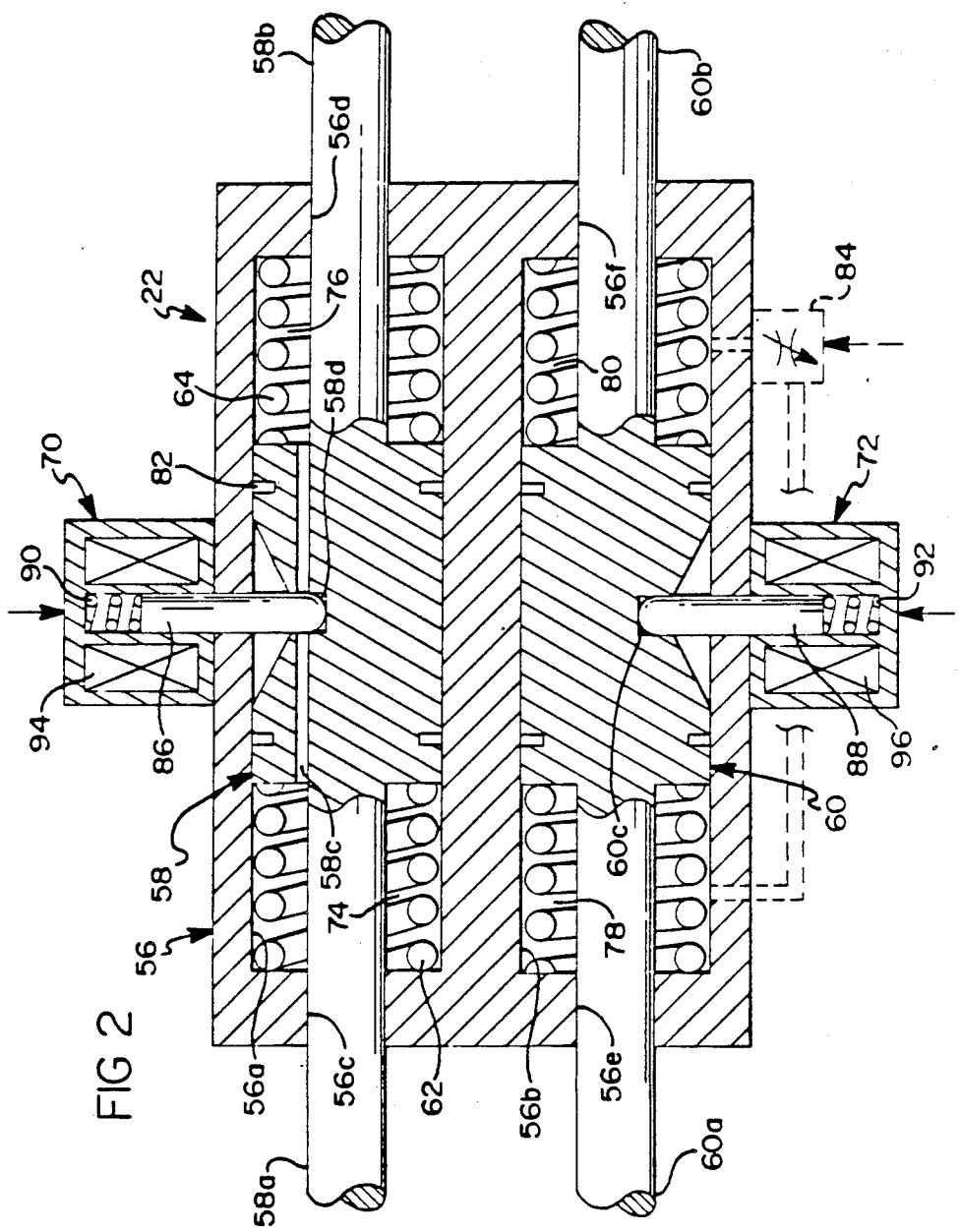
FIG. 2 is a schematic sectional view of the apparatus.

The schematic plan view of FIG. 1 illustrates a steering system 10 for a wheeled vehicle having a body and chassis represented by phantom line 12, and front and rear steerable wheel assemblies 14,16. The system includes a steering wheel 18, a power steering assembly 20 for transmitting steering movement of the steering wheel to the front wheel steering assembly, an apparatus 22 for controlling passive steering, and control assembly 24.

The front wheel steering assembly 14 includes front wheels 28 each having a steerable knuckle arm 30 pivotally connected together by tie rod ends 32a,32b of a tie rod or ram 32 disposed for to-and-fro movement transverse to the longitudinal direction or axis of the vehicle in known manner. The tie rod or ram 32 forms part of power steering assembly 20 and is discussed further hereinafter. The rear wheel steering assembly 16 includes rear wheel assemblies 34 supported from the vehicle chassis by pairs of transverse parallel swing links 36,38 and 40,42, the apparatus 22, and the control 24.

Assembly 20 may be any of several well known mechanical non-power or power steering assemblies which transmit steering movement to the front wheel steering assembly in response to steering movement of the steering wheel. Apparatus 20 is preferably of the power steering type and, as illustrated therein, is of the well known hydraulic type including a source of pressurized hydraulic oil or fluid provided by a pump 44 in known manner, a sump 46, and a servo valve 48 for connecting or communicating the source and sump with opposite sides of an unshown piston disposed in a power cylinder 50. Tie rod ends 32a,32b extend from opposite sides of the pistons and move together in to-and-fro motion in response to alternate porting or communication of opposite sides of the unshown power cylinder piston with the source and sump by valve 46.

Swing link pair 36,38 is pivotally attached in known manner at their wheel ends 36a,38a to a stub axle assembly 52 having an axle portion 52a mounting a wheel 54 for rotation and track parallel to the longitudinal axis of the vehicle. End 36a is mounted in front of axle portion center line 52b and end 38a is attached to the rear of the center line. The wheel ends of link pair 40,42 are attached to wheel assembly 34 in the same manner.

Passive steer apparatus 22 includes a housing 56 fixed to the vehicle chassis and defining cylindrical closed bores 56a,56b having axes parallel to the transverse vehicle axis, pistons 58,60 slidably disposed therein for to-and-fro movement, spring pairs 62,64 and 66,68 respectively biasing the pistons in opposite directions, and latches 70,72. Pistons 58,60 respectively include rod portions 58a,58b and 60a,60b extending axially therefrom and through openings 56c, 56d and 56e,56f in the housing. The rod portions each form sliding/sealing relation with the openings in known manner. The piston ends and the housing form variable volume chambers 74,76 and 78,80 containing a fluid. The fluid may be a compressible gas such as air but is preferably oil. Uncontrolled leakage of fluid between chambers 74,76 and chambers 78,80 is prevented by seals 82 retained in grooves in the pistons. Controlled flow of fluid between the chamber may be controlled by means of fixed restriction such as passage 58 in piston 58 or by variable restriction such as device 84 shown in phantom line and controllable by control assembly 24. Latches 70,72 each include a locking pins 86,88 biased to by springs 90,92 to first positions received by recess 58d,60c in the pistons and a solenoids 94,96 operative when energized to move the respective pins to a second position withdrawn from the recesses for allowing to-and-fro movement of the pistons in their respective bore. Devices 98 pivotally attach the free ends of rod portions 58a,58b,-60a,60b to the other ends of the swing links in known manner. Alternatively, only links 36,38 or links 40,42 may be provided with apparatus for passive steering. Further, the apparatus for passive steering may take the form of multiple units individually attached to the other ends of the swing links.

Figure 3A:
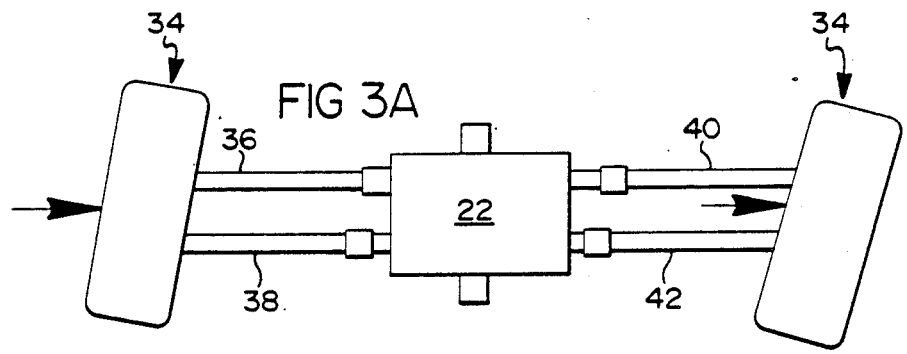
FIGS. 3A, 3B respectively show same and opposite direction steer angles during a right turn of the vehicle.
Figure 3B:
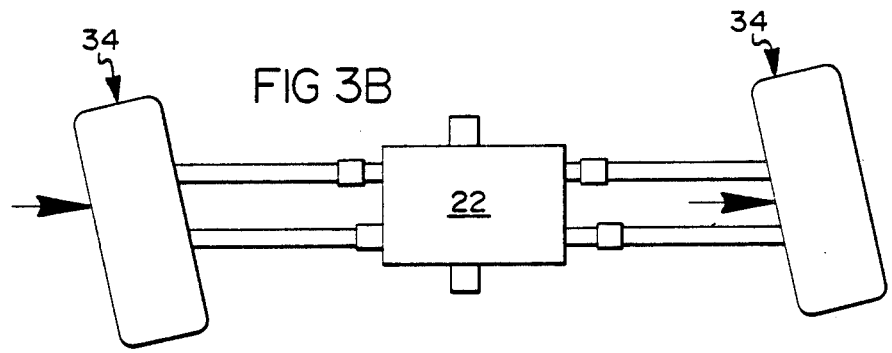
Figure 4A:
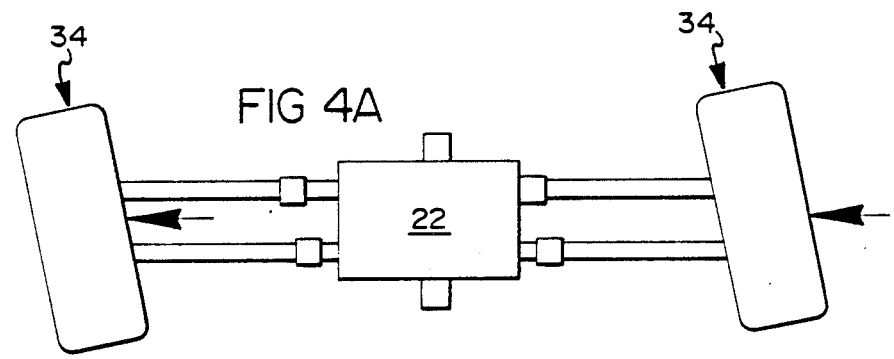
FIGS. 4A, 4B respectively show same and opposite direction steer angles for a left turn of the vehicle.
Figure 4B:
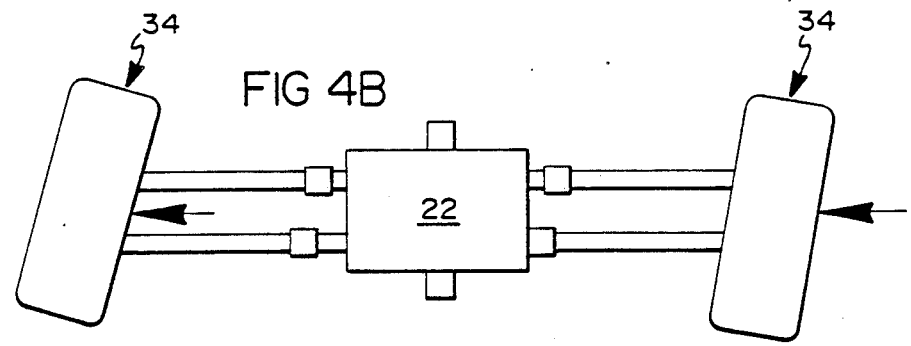

Control assembly 24 includes a vehicle speed sensor 100 and a front wheel steer angle sensor 102 providing signals to a logic 104. The logic provides signals to solenoids 70,72 for maintaining the latch pins 86,88 in the first or locking positions in response to the front wheel steer angle being neutral or straight ahead. The logic provides signals for only moving latch pin 86 to the second or unlocking position in response to right steer angles less than a predetermined amount, e.g., 10 degrees. Whereby lateral forces F acting of the rear wheels due to vehicle turning, will move piston 58 transverse to the right to effect rear wheel steer angles in the same direction as the front wheels, as shown in FIG. 3A. The logic provides signals for only moving latch pin 88 to the second or unlocking position in response to right steer angles of the front wheels greater than the predetermined amount and provided vehicle speed is less than a predetermined amount, e.g., 20 mph. Whereby the lateral forces will move piston 60 transverse to the right to effect rear wheel steer angles in directions opposite the front wheels as shown in FIG. 3B. Same and opposite direction steering for left turns is analogous to right turns and is respectively shown in FIGS. 4A and 4B.

An embodiment of the invention has been disclosed therein for illustrative purposes. Many variations and modifications of the disclosed embodiment are believed to be within the spirit of the invention. The following claims are intended to cover the inventive features of the disclosed embodiment and variations and modifications believed to be within the spirit of the invention.

What is claimed is:

1. An apparatus for varying the steer angle of rear wheel assemblies of a vehicle having longitudinal and transverse axes and steerable front wheels, each wheel assembly including a wheel mounted for rotation and track parallel to the longitudinal axis on a stub axle supported from the vehicle chassis by at least pairs of transverse and substantially parallel swing links pivotally attached at one end to the wheel assembly ahead of and to the rear of the axle center line; the apparatus comprising:

rear steer means including means for mounting the other end of at least one of each pair of links for movement transverse to the vehicle, means for biasing the transversely movable ends in opposite direction transverse to the vehicle, and latch means having a first position locking the movable ends in a position wherein the rear wheels track parallel to the longitudinal axis and a second position allowing the movable ends to move transverse in the same direction in response to transverse forces acting on the rear wheels.

2. The apparatus of claim 1, wherein the links attached ahead of the axial center line are operatively associated with the first mentioned rear steer means and the links attached to the rear of the axle center line are operatively associated with a second such steer means; and wherein the latch means second position of the first steer means effects rear wheel steer angles in a same direction as the front steer angles, and the latch means second position of the second steer means effects rear wheel steer angles opposite the direction of the front wheel steer angles.

3. The apparatus of claim 1, wherein the steer means includes a piston disposed for to-and-fro sliding movement in a closed bore of a housing in response to movement of the movable link ends, a variable volume chamber at each end of the piston, a passage interconnecting fluid in the chambers, and restriction means in the passage.

4. The apparatus of claim 3, wherein the restriction means is variable.

5. The apparatus of claim 1, further comprising a control system including a front wheel steer angle sensor providing signals for moving the latch means to the second position in response to predetermined left and right front wheel steer angles.

6. The apparatus of claim 2, further comprising a control system including a front wheel steer angle sensor providing signals for moving the latch means of the second steer means to the second position in response left and right front wheel steer angles greater than a predetermined amount and for moving the latch means of the first steer means to the second position in response to left and right front wheel steer angles less than the first predetermined amount.

7. The apparatus of claim 6, wherein the control means includes a vehicle speed sensor operative to prevent movement of latch means of the second steer means to the second position in response to vehicle speeds greater than a predetermined amount.

* * * * *